United States Patent [19]
Hart

[11] 3,870,022
[45] Mar. 11, 1975

[54] POULTRY WATERING DEVICE

[75] Inventor: Harold W. Hart, Glendale, Calif.

[73] Assignee: H. W. Hart Mfg. Co., Glendale, Calif.

[22] Filed: Mar. 19, 1973

[21] Appl. No.: 342,387

[52] U.S. Cl. .................................................. 119/75
[51] Int. Cl. ............................................ A01k 39/02
[58] Field of Search ............................. 119/75, 72.5

[56] References Cited
UNITED STATES PATENTS

| | | | |
|---|---|---|---|
| 2,845,046 | 7/1958 | Hart | 119/75 |
| 3,043,267 | 7/1962 | Blough | 119/75 |
| 3,353,518 | 11/1967 | Hart | 119/75 |
| 3,483,847 | 12/1969 | Kneubuehl | 119/75 |
| 3,582,006 | 6/1971 | Thompson | 119/72.5 |

*Primary Examiner*—Hugh R. Chamblee
*Attorney, Agent, or Firm*—Ellsworth R. Roston

[57] ABSTRACT

A poultry drinking cup having a cup body with an input opening for engagement with a water feed line. Valve means control the flow of water through the input opening into the cup body and the cup is supported by a snap-fitting member connected to the cup. The snap-fitting member may include a cavity which is engageable with the water feed line or a support member and retaining means are provided to maintain the cavity in engagement with the water feed line or support member.

The poultry drinking cup may include an outwardly flared, upwardly projecting skirt on the cup body. The valve means is preferably controlled by means of a trigger or fount which extends into the cup body. The low point within the cup body is preferably positioned in close proximity to the trigger or fount.

18 Claims, 21 Drawing Figures

PATENTED MAR 11 1975 3,870,022

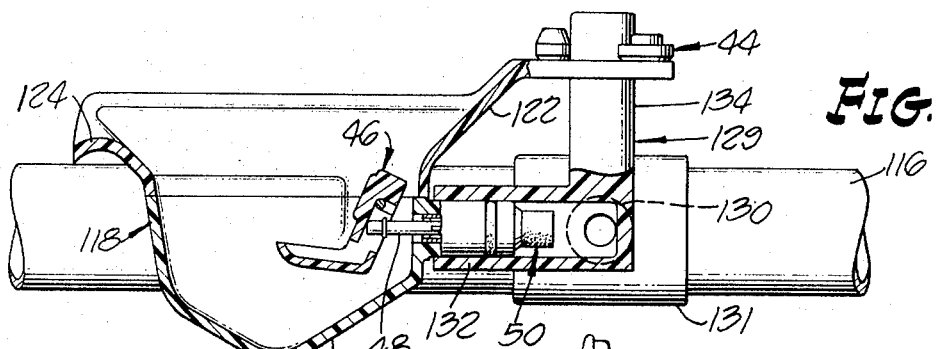
FIG. 11.
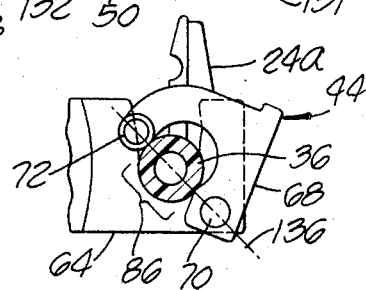
FIG. 6A.
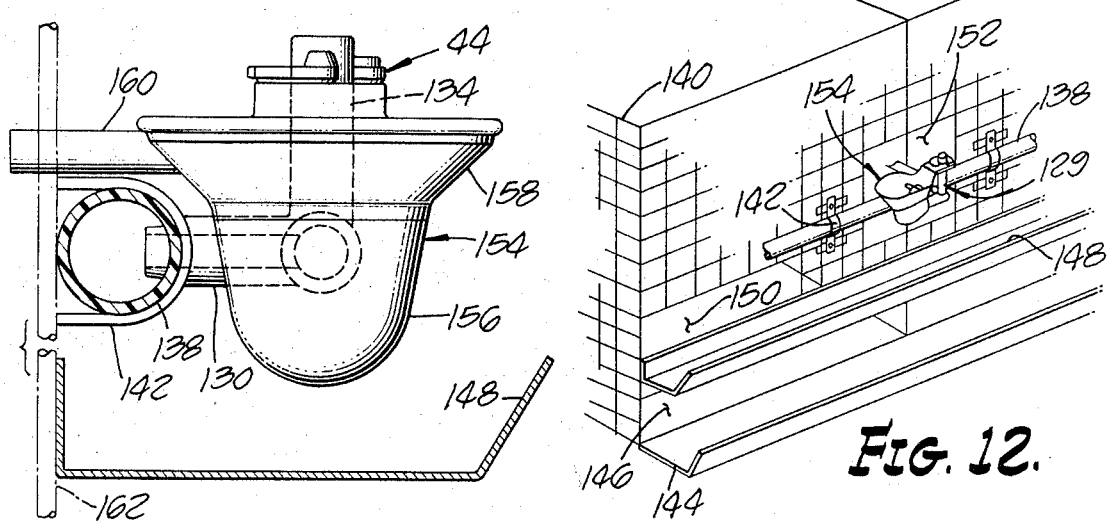
FIG. 13.
FIG. 12.
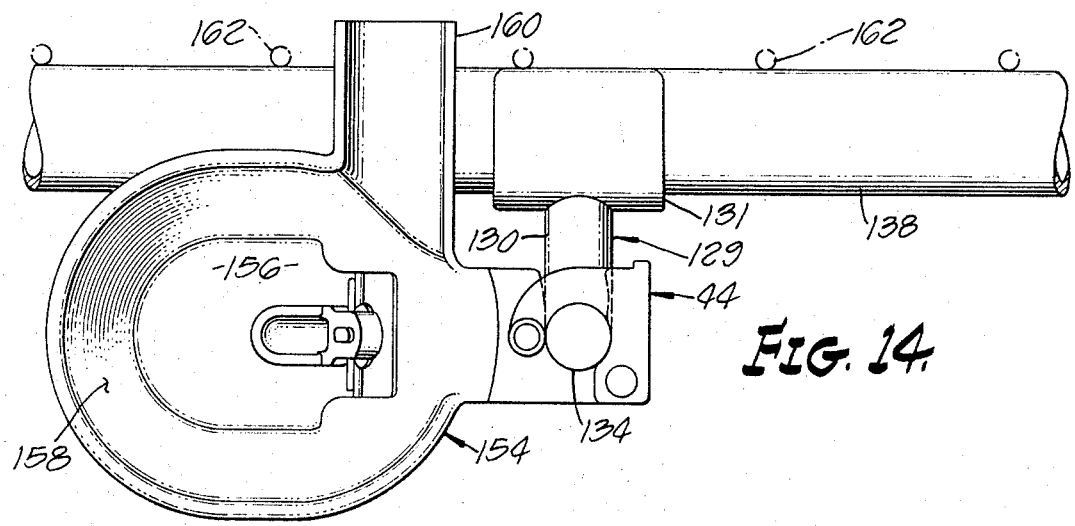
FIG. 14.

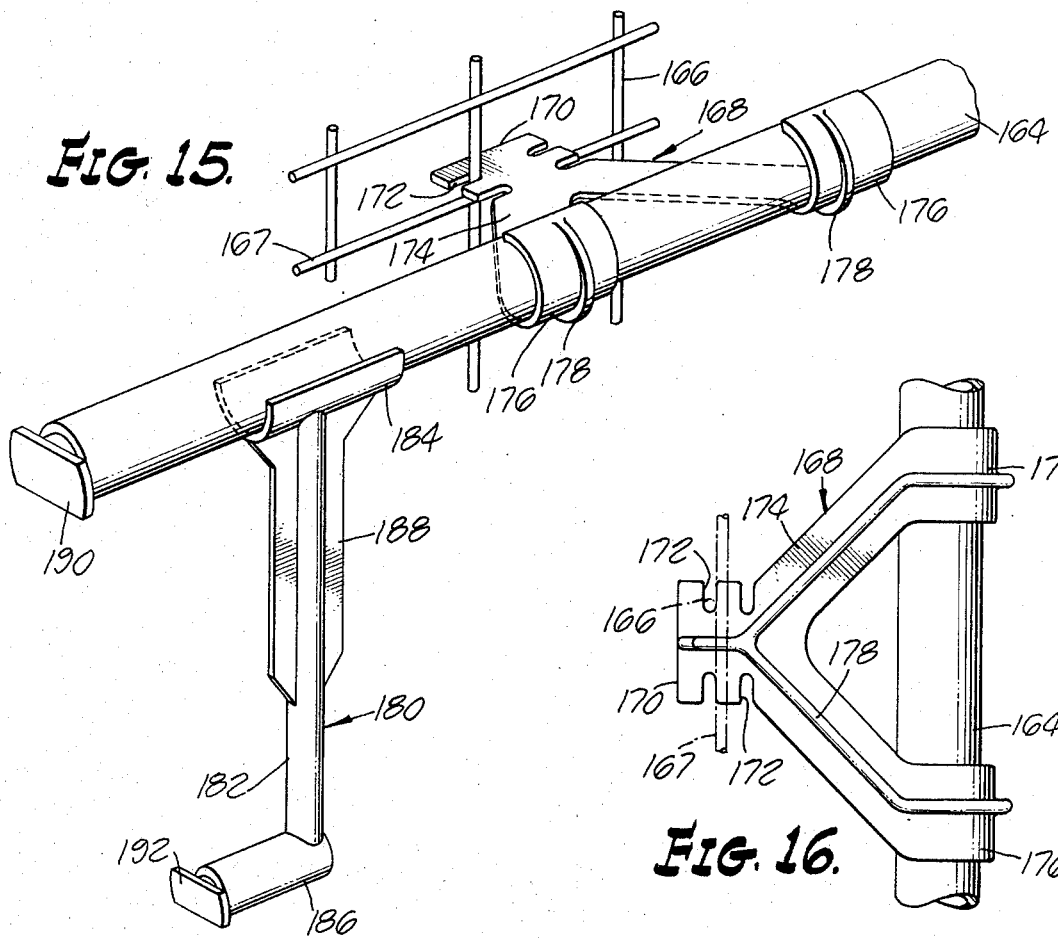
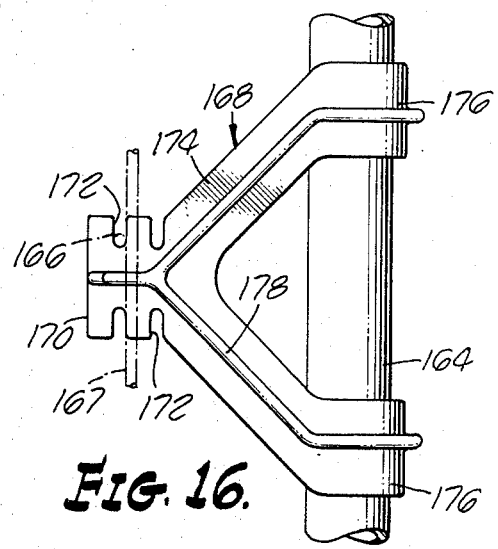
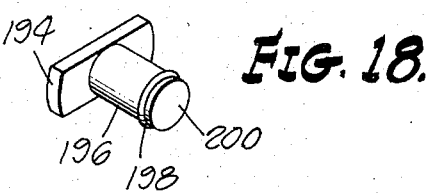
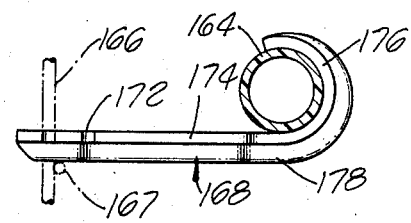
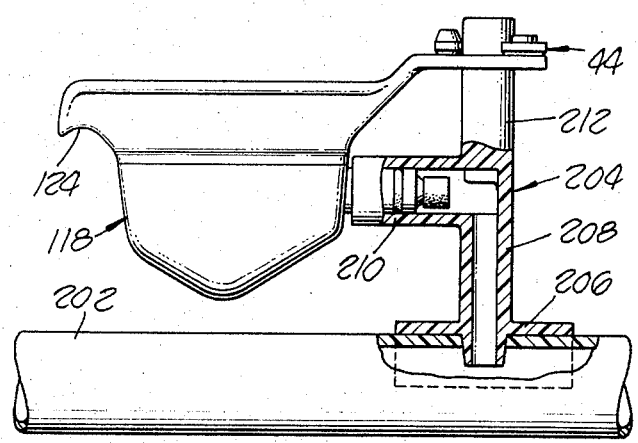

POULTRY WATERING DEVICE

BACKGROUND OF THE INVENTION

Poultry provide a very important food source as eggs and meat. In modern poultry raising, literally thousands of birds are housed in large buildings which may contain row upon row of cages that are generally positioned along the long dimension of the building. To increase the number of poultry which can be housed in a single building, it is a common procedure to arrange the cages in tiers with the cages being double or triple decked. Separators are positioned beneath the bottoms of the upper cages to deflect the droppings away from the lower cages.

The poultry industry is competitive where the difference between success and failure may be determined by the use of modern labor-saving equipment. Also poultry may be very susceptible to disease under the close conditions used in modern poultry raising. Thus, it is important that the conditions under which the poultry are fed and watered be controlled to prevent disease, to save on labor costs, and to maintain the birds in a good state of health.

In many poultry raising installations, the birds are watered through use of a long trough which may be positioned along a row of cages with openings in the cages providing access to the trough. To maintain the water in a fresh condition, it must be recirculated since standing water is a good growth medium for various types of bacteria such as bacteria which causes enteritis in poultry.

In addition to a water trough, a feed trough will also be positioned on the cages. As the poultry feed and drink within the relatively small confines of the individual cages, a certain amount of feed will be transferred by the poultry from the feed trough to the water trough. Also, dust and dirt particles in the air will settle into the water trough. The various types of solid particles which collect in the water trough make it difficult to keep the trough clean. The solid particles interfere with recirculation of the water and can cause stoppages which obstruct the flow of water through the trough.

Should a stoppage occur in a water trough which supplies water for a large number of birds, a considerable amount of water may overflow onto the floor. The poultry droppings, as described previously, may fall onto the floor of the poultry house where they are periodically collected and removed.

Poultry droppings are much more manageable in a relatively dry state and the contact of water with poultry droppings may produce an unsanitary condition. The contact of water with poultry droppings promotes the formation of ammonia which can be irritating to the poultry and to personnel working in the poultry house. In addition, contact of water with the poultry droppings makes the droppings more difficult to remove since they cannot be conveniently scooped and handled in the same manner as relatively dry droppings.

In meeting the problems posed by the use of water troughs in poultry raising, many poultry raisers now use poultry drinking cups which may be positioned periodically along a row of poultry cages. The cups are each connected through a water feed line fitting to a main water line that may be positioned along the front of a row of cages or along the cage tops, etc. Each of the cups is individually supplied through a water feed line fitting from the main water line to supply water for the birds in one or more cages having access to a drinking cup. The poultry drinking cups are supplied with a valve means to control the flow of water into the cup with the valve means preferably being actuatable by the poultry. Thus, for example, each cup may contain a trigger or a fount whose movement controls the position of the valve means and the flow of water into the cup.

After a time, poultry which are watered with a drinking cup learn how to operate the cup by pecking at the trigger or fount. The cup, thus, provides a source of water which is available on demand by the poultry. Since a single cup will only supply the water needs of a limited number of birds, the leakage of water from a single cup does not pose the same kind of problems as the leakage of water from an obstructed drinking trough which may supply water for a whole row of cages.

A single poultry house may then contain literally thousands of poultry drinking cups which are connected by water feed lines or fittings to a main water line. Periodically, individual cups may have to be replaced or removed for cleaning, etc. At present, this is a laborious task since the cups are individually threaded onto the water feed lines or fittings. Thus, it would be desirable to provide poultry drinking cups which could be readily connected to water feed lines without threading the cup onto the line. This would result in a considerable savings in time and would eliminate the problem of cross-threading where the threads of a cup may be permanently damaged.

During usage of a poultry drinking cup, the beak of the bird is thrust into the cup. Then, as the bird's head is withdrawn from the cup, a certain amount of water may be spilled by the movement of the bird's lower bill. It would be desirable to reduce this water spillage.

During usage, poultry drinking cups may be positioned above a poultry feed trough which runs along the front of a row of cages. In this type of an arrangement, which may be dictated by the shape of the cages and the space available for providing feed and water, there is considerable opportunity for water to spill from the cups into the feed trough. For example, if the valve mechanism of a poultry drinking cup becomes clogged and remains open, water will flow over the side of the cup and into the feed trough.

Drinking cups which may be positioned above a feed trough during usage should desirably include means to divert water which spills from the cups so that it does not fall into the feed trough. This would reduce feed spoilage and would also result in a time savings since the feed trough would not have to be cleaned as frequently.

Frequently, individual drinking cups may be positioned in an opening in a partition between individual cages so that access to the cup may be had from either cage. In securing a cup within such an access opening, it would be desirable that the drinking cup be positioned to provide for easy securing of the cup to the feed line. Further, it would be desirable that the feed line itself be fixedly positioned so as not to be moved by birds using the cup.

In older poultry houses, which previously used a trough for supplying water to the poultry, individual watering cups may be placed above the existing watering trough. With this type of arrangement, it would be desirable to provide the cups with means to divert spilled water into the existing trough. The existing trough would, thereby, serve as a catch basin to carry away the spilled water.

In training poultry to use a drinking cup, it is desirable to attract the poultry to a trigger, fount or other means extending into the cup body whose movement actuates a valve mechanism. Initially, the poultry will not know enough to peck at the trigger or fount. However, when they have obtained water a sufficient number of times by striking the trigger or fount, they will learn to obtain water in this manner.

When a poultry cup is almost empty, the water within the cup settles at a low point within the cup body. To attract the poultry to the trigger or fount, it would be desirable to position the low point of the cup body in close proximity to the trigger or fount. Then, when the poultry obtain water from the low point within the cup body, they will accidently strike the trigger or fount to actuate the valve mechanism.

In watering a large number of poultry within a poultry house, a main water supply pipe may have a length of as much as 300 feet or more and be subjected to wide temperature changes. These temperature changes can cause a considerable contraction and expansion of the pipe. To control expansion, an expansion joint or slidable coupling may be positioned between the shorter pieces of pipe making up the overall pipe span.

These individual pieces of pipe should be fixedly secured in some manner so that they do not move relative to the poultry cages to move the drinking cups with respect to the poultry cages. Thus, it would be desirable to have pipe securing means for conveniently anchoring the shorter pieces of the pipe to the cages. Since the placement of the pipe and the shapes and arrangement of the cages will change from one poultry installation to another, it would be desirable to have a pipe supporting means to support a pipe in any desired position with respect to a poultry cage.

In supplying poultry drinking cups and associated piping and fitting to a poultry raiser, the pipes and fittings, etc. may come into contact with debris of one type or another. This can cause serious problems since debris within the pipes or fittings may clog the pipe or fitting or interfere with the valve mechanism for a drinking cup. Further, during installation, the pipes and fittings will initially be full of air. The presence of air may cause problems after start up by interfering with the operation of the valve mechanism for the cups, etc.

In dealing with problems caused by air or debris, it would be desirable to provide closure means for the pipes and fittings prior to their installation within a poultry house. This would keep the pipes and fittings clean and free from debris. Then, after assembly of the pipes and fittings, but prior to installation of the cups on the feed line fittings, water could be admitted into the water pipe with the cups being sequentially installed as air is bled from the pipes and fittings.

SUMMARY OF THE INVENTION

In providing solutions for the various aforementioned problems, I have provided a poultry drinking cup having an input opening for connection to a water feed line with a snap-fitting member connected to the cup for engagement with a water feed line or a support member. With the snapfitting member engaging the water feed line or support member, the poultry drinking cup is held with its input opening in engagement with the water feed line to receive water from the feeder line.

The snap-fitting member may include a cavity which is engageable with a water feed line or a support member. Retaining means may also be provided to maintain the cavity in engagement with the water feed line or support member.

Valve means may be provided to control the flow of water through the input opening into the cup body. A trigger, fount, or other means may be connected to the valve means and project into the cup body where it may be struck by the poultry to actuate the valve means and introduce water into the cup body.

To attract poultry to the trigger, fount, or other similar actuating means, a low point is provided within the cup body which is positioned in close proximity to the trigger, fount, etc. As the cup becomes depleted of water, the water collects at the low point and serves as a lure to the poultry. On drinking from the low point within the cup body, the trigger or fount will be struck by the poultry to actuate the valve means and introduce water into cup.

In another aspect of the invention a poultry cup is provided which has a cup body and an outwardly-flared, upwardly-directed skirt on the cup body which is positioned to increase the area of the cup. The skirt serves to deflect water splashed by the birds back into the cup body such that spillage is reduced during drinking.

The skirt may include water-diverting means so that water which overflows from the cup is directed through the water-diverting means. The water-diverting means may take the form of a spout which is axially positioned with respect to the axis of the drinking cup. Also, the diverting means may take the form of a side spout positioned transversely to the axis of the cup body.

In securing a poultry drinking cup adjacent an access opening in a partition between adjoining cages, a water feed line fitting may be provided which includes a plurality of wire clips projecting from the feed line fitting that are shaped and positioned to provide a locking connection to a wire, such as a cage wire, when the wire clips are brought into contact with the wire. The wire clips are preferably staggered in their placement on the feed line fitting such that successive clips fit on opposite sides of the wire in securing the feed line fitting to the wire. Each of the wire clips may include a wire-contacting surface with the wire-contacting surfaces of successive wire clips positioned in facing relation. Also, the wire clips may include a wire-retaining groove on each of the wire contacting surfaces. Thus, the feed line fitting may be secured to a wire by slipping the wire between successive wire clips into contact with the wire-contacting surfaces which guide the wire into the wire-retaining grooves.

In securing a poultry drinking cup to a water feed line through the use of a snap-fitting, a feed line fitting may be provided which has a support post positioned adjacent the end of the fitting to engage a snap-fitting poultry drinking cup, with the post being shaped and positioned to provide supporting engagement with the snap-fitting on the cup with the cup connected to the fitting for receipt of water from the water feed line. The post may be positioned perpendicularly to the axis of the feed line fitting at a point adjacent the end of the fitting which is connected to the poultry drinking cup. Also, the fitting may be formed of two interconnected liquid-conducting legs, i.e., a cup-fitting leg for connection to a snap-fitting poultry drinking cup and a main fitting leg for connection to the water feed line. The cup fitting leg and the main fitting leg may be positioned at approximately a right angle with respect to each other with the support post then being positioned at approximately a right angle to the cup fitting leg.

The cup fitting leg and the main fitting leg may lie substantially in a common plane with the support post being positioned at approximately a right angle with respect to the common plane. In this instance, when the main fitting leg is connected to the side of a water feed line, the cup leg will lie approximately in a horizontal plane which contains the axis of the water feed line.

Also, however, the cup fitting leg and the main fitting leg may lie substantially in a common plane with the support post positioned approximately in the common plane. In this instance, when the main fitting leg is connected to a water feed line, the cup leg will lie approximately in the vertical plane which contains the axis of the water feed line.

In another aspect of the invention, a resilient plug may be provided which is composed of a head that may be grasped by the fingers, a shaft for insertion into a pipe or fitting opening and an annular bead formed on the surface of the shaft to assist in forming a liquid-tight seal within a pipe or fitting opening. Such a plug may be utilized in the manner previously described to prevent the entry of dirt or debris into pipes or fittings prior to their installation. Moreover, such a plug may be used during installation of the pipes and fittings in bleeding the pipes and fittings of air through sequential installation of the poultry drinking cups on the feed line fittings.

In still another aspect of the invention, a feed line fitting is provided which has improved strength. The fitting includes a main fitting leg and a cup fitting leg with a saddle positioned adjacent to the end of the main fitting leg for connection to a liquid header. An axial support rib is provided on the exterior of the main fitting leg with the axial support rib merging into the saddle. Bending forces which may be transmitted to the main fitting leg are, thereby, transferred into the saddle and then to the pipe to which the saddle may be connected. Preferably, at least two axial supporting ribs are provided on the exterior of the main fitting leg to transmit bending forces which may be applied in either of several directions to the main fitting leg.

In a further aspect of the invention, a pipe support is provided which includes wire-engagement means having wire openings positioned along its sides, yoke means interconnected with the wire engagement means, and pipe clamping means provided at the extremeties of the yoke means. In usage, the wire-engagement means may be readily snapped into engagement with a wire while the pipe clamping means are positioned to provide bonding contact between the yoke means and the circumferential surface of a pipe.

DESCRIPTION OF THE DRAWINGS

In the drawings, which are illustrative of an embodiment of the invention,

FIG. 6A is a detailed view of the snap-fitting member showing the pressure contact of an end portion of the latch member with the feed line during rotation of the latch member between an open and a closed position;

FIG. 11 is a side sectional view of the drinking cup of FIG. 10 taken along the section lines 11—11 and illustrating a side-mounting fitting through which the cup is secured to the water line;

FIG. 12 is a pictorial view of the front of a row of cages with a drinking cup on the front of the cages above a feed trough and with the drinking cup having a side spout to divert any overflowing water away from the feed trough;

FIG. 13 is a front view of the drinking cup of FIG. 12 which shows its placement relative to the feed trough;

FIG. 14 is a plan view of the drinking cup of FIG. 13;

FIG. 15 is a pictorial view of a water supply line connected to the wires of a cage by a pipe support which fixes the position of the pipe with respect to the cage, the pipe being closed at its open end by a protective plug and having a downwardly directed feed line fitting with axial reinforcing ribs and a protective plug at its discharge end;

FIG. 16 is a bottom view of the pipe support illustrated in FIG. 15;

FIG. 17 is a side elevation of the pipe support of FIGS. 15 and 16;

FIG. 18 is an isometric view of a protective plug for closing an end opening of a water pipe or feed line fitting;

FIG. 19 is a side view, in partial section, of a drinking cup having an axial spout positioned on a feed line fitting which rises vertically from a water supply pipe.

DETAILED DESCRIPTION

Figure 1:
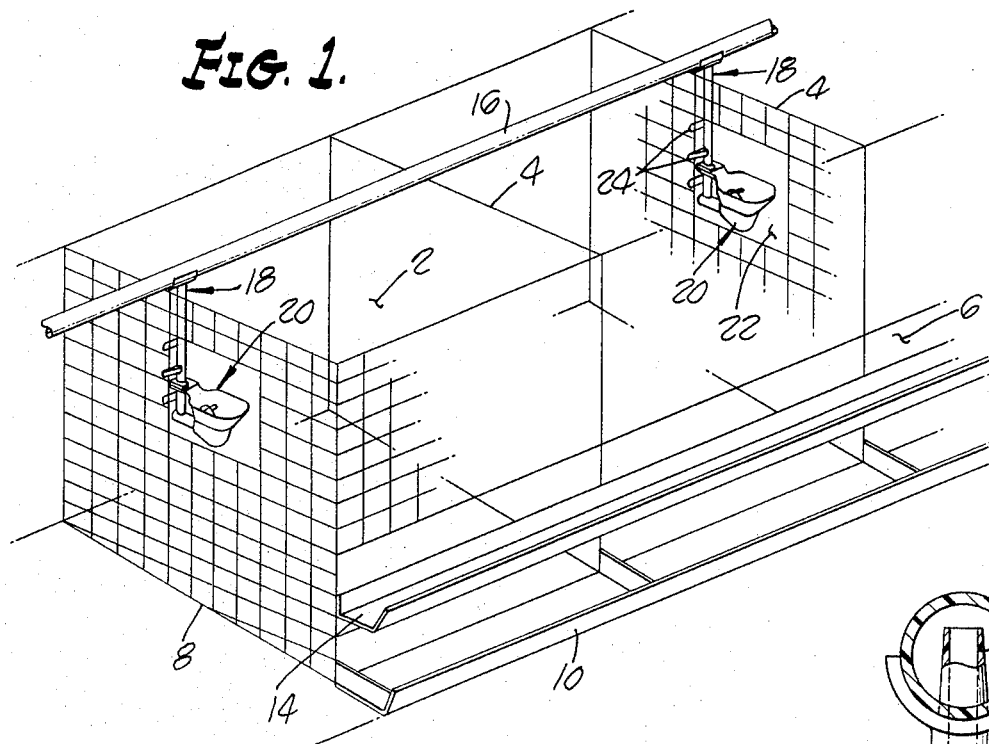
FIG. 1 illustrates a row of cages having a water pipe positioned along the top surfaces of the cages with feeder lines projecting downwardly and being secured to the cages to provide support for drinking cups positioned in openings between individual cages.

As shown in FIG. 1, a series of poultry cages 2 arranged in a row are provided with cross partitions 4 and front openings 6 for access by the poultry to a feed trough 14. The cage bottoms 8 slope toward the front of the cages 2 so that eggs will roll down the cage bottoms into an egg trough 10.

A water line 16 is positioned along the tops of the cages 2 with downwardly projecting feed line fittings 18 being provided at every other cross partition 4. Poultry drinking cups 20 are connected to the feed line fittings 18 and the fittings are secured to the partitions 4 by means of wire clips 24. The poultry drinking cups 20 are, thereby, positioned within partition openings 22 so that the cups are accessible through the openings by birds in the cages on either side of the partition.

Figure 2:
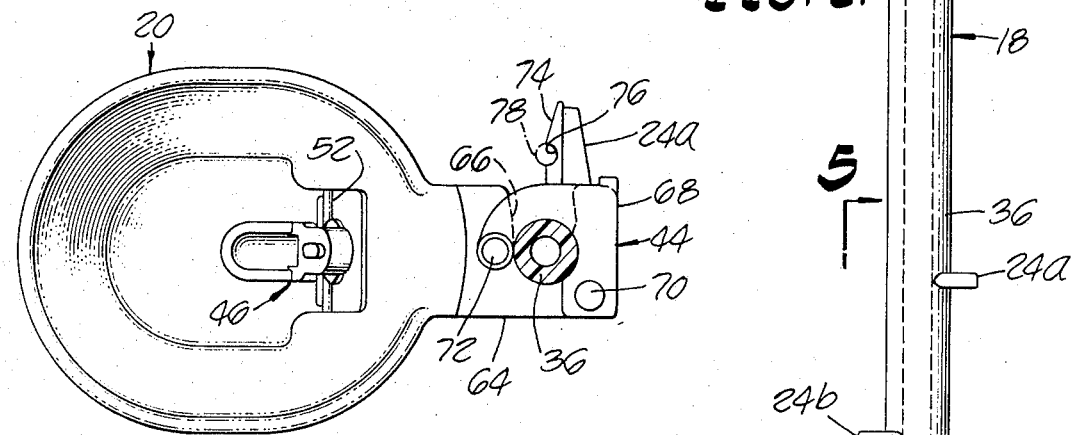
FIG. 2 is a partial side sectional view of one of the poultry drinking cups shown in FIG. 1 and illustrating the position of the poultry drinking cup relative to the water supply line.

Turning to FIG. 2, the poultry cup 20 is composed of a cup body 26 which may be formed of a molded plastic material that may be strengthened, for example, by the inclusion of fiberglass to increase its strength and resistance to damage by the poultry. The cup body 26 is connected to an outwardly-flared, upwardly-directed skirt 28 on the cup body which may also be formed of a molded plastic. The skirt 28 and body 26 may be joined together in any convenient manner, such as the use of sonic welding.

In usage, the birds receive water from the cup body 26 by lowering their heads and placing their beaks into the water within the body. Then, as the birds raise their heads, there is a natural tendency for the lower bill of the bird's beak to throw some water out of the cup. However, the skirt 28 affords a larger upper surface area for the cup which reduces the amount of water spillage through the bobbing movement of the birds' heads during drinking. The line 30 indicates the line of jointure of the cup body 26 and the skirt 28.

The feed line fitting 18, through which the cup 20 is connected to the water line 16, includes a saddle 32 which partially encircles the water line 16 for easy connection of the fitting to the water line. Thus, for example, the fitting 18 may be secured to the water line 16 by inserting an extension 34 on the fitting into a hole in the water line 16. With the extension 34 in engagement with the hole in the water line, the saddle 32 is brought into contact with the exterior surface of the water line. A plastic glue or cement positioned on the upper surface of the saddle 32 will, thereby, be pressed between the saddle and water pipe to fixedly secure the saddle to the water pipe.

As illustrated, the fitting 18 is L-shaped, having a main leg 36 and a cup leg 38. A stub inlet 40 on the drinking cup 20 is slidably positioned within the cup leg 38 with an O-ring or other suitable sealing member 43 providing fluid tight engagement between the stub inlet 40 and the cup leg 38. With the stub inlet 40 engaged within the cup leg 38, a snap-fitting 44 releasably secures the drinking cup 20 to the feed line fitting 18.

A trigger 46 is rotatably positioned within the cup body 26 adjacent a back surface 49 with the trigger being connected to a push rod 48 for actuation of a valve mechanism 50. A pivot support 52 passing through the trigger 46 is secured at either of its ends to the walls of the cup body to provide rotational support for the trigger.

The trigger 46 has an angular-shaped configuration in cross-section and is composed of an upper angle member 54 and a lower angle member 56 which contains a receptacle 58. An opening 60 leads from the receptacle 58 to a recessed portion 61 in the back of the trigger which engages the end of the push rod 48. Water flowing through the valve mechanism 50 will flow to some extent along the outer surface of the push rod 48 and then downwardly through the opening 60 into the receptacle 58. The water contained in the receptacle 58 attracts the poultry to the trigger 46 and, in attempting to obtain water from the receptacle, the poultry strike the trigger with their beaks. This, actuates the valve mechanism 50 to admit water into the drinking cup 20.

Water flowing into the cup through the valve mechanism 50 flows downwardly through a trough-like depression 51 into the cup body 26. As shown, the cup body 26 has a low point 62 which is positioned beneath the trigger 46. As the water supply in the cup 20 is depleted, the water collects at the low point 62. Due to the close proximity of the low point 62 to the trigger 46, the birds will accidentally strike the trigger in attempting to drink from the low point. This admits more water into the cup and assists in the learning process by which the poultry are taught to use the trigger 46 in obtaining water.

The wire clips 24 are positioned on either side of the axis of the main fitting leg 36 in an alternating fashion, as shown, with wire clips 24b being shown on one side of the axis of the leg 36 and clips 24a on the opposite side of the leg 36. As will be described, the placement of the wire clips 24a and 24b provides cooperation between adjacent clips in gripping the wire of the poultry cage to fix the position of the feed line fittings 18 with respect to the cages.

Figure 3:
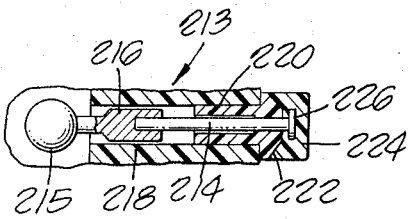
FIG. 3 is a top view of the drinking cup of FIG. 2 taken along the section lines 3—3 and illustrating the structure of the snap-fitting member used to secure the poultry drinking cup to the water feeder line.

Turning to FIG. 3 which is a top view of the poultry cup 20 along the section lines 3—3 of FIG. 2, the wire clip 24a has a wire contacting surface 74 which is in close proximity to the axis of the main fitting leg 36 with the surface 74 sloping inwardly toward the leg axis to a retaining groove 76 which contacts a cage wire 78. In usage, the wire clip 24a cooperates with an adjacent wire clip 24b which would appear as a mirror image of the clip 24a as shown in FIG. 3.

Thus, the two clips 24a and 24b cooperate by exerting forces on opposite sides of the wire 78 such that the wire is held on one side by the groove 76 in wire clip 24a and is held on its opposite side by contact with a groove in the wire clip 24b. The wire contacting surface 74 on the clip 24a cooperates with a corresponding wire contacting surface on the adjacent companion clip 24b with the two wire contacting surfaces sloping toward each other in guiding the wire 78 into the retaining grooves in the clips, e.g., groove 76, with the wire positioned along the axis of the main fitting leg 36 and grasped on either side along its length by the cooperative action of clips 24a and 24b.

The snap-fitting 44 includes a support plate 64 having a cavity 66 therein which partially surrounds the exterior surface of the main fitting leg 36. A latch member 68, which is connected through a pivot 70 to the plate 64, is rotatable to the closed position shown in FIG. 3 in which the latch member encloses the cavity 66 to retain the main fitting leg 36 within the cavity. As shown, the latch member 68 includes an end enlargement 72 which cooperates with the exterior surface of the main fitting leg 36 to maintain the latch member in a closed position.

Figure 4:
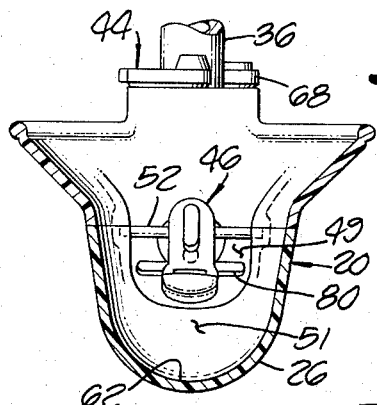
FIG. 4 is a sectional view through the poultry drinking cup along the lines 4—4 as shown in FIG. 2 illustrating the position of the low point within the cup body in close proximity to a trigger which is used to control the valve mechanism for the drinking cup.

FIG. 4, which is an end sectional view taken along the section lines 4—4 of FIG. 2, illustrates the side positioning of the trigger 46 within the drinking cup 20. A pair of positioning ears 80 which extend laterally from the trigger 46 maintain the position of the trigger 46 between the sidewalls of the cup body 26. This insures that the trigger 46 is properly centered with respect to the push rod 48 so that rotational movement of the trigger is properly translated into lineal movement of the push rod.

Figure 5:
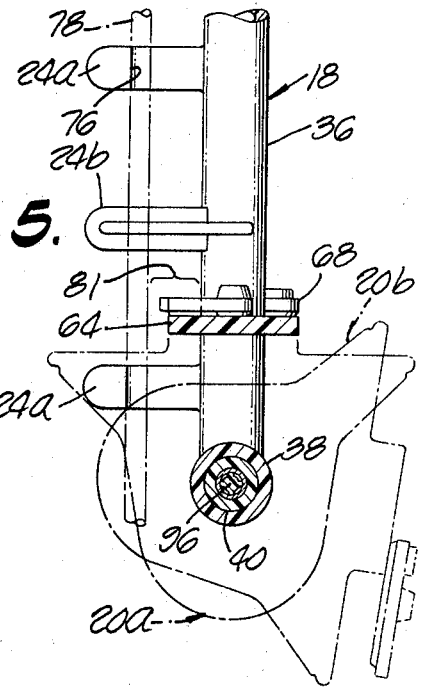
FIG. 5 is an end view of the drinking cup of FIG. 2 illustrating the manner in which the cup is rotated to release the snap-fitting member from the feeder line during removal of the drinking cup from the feeder line.

During the placement of a drinking cup 20 on one of the feed line fittings 18, the cup is rotated with respect to the fitting. This is illustrated in FIG. 5 in which the cup is illustrated in phantom line drawing as 20a in its position in connection with the fitting 18 and is shown in phantom line drawing as 20b in its rotated position with respect to the fitting. During placement of a drinking cup 20 on a fitting 18, the stub inlet 40 of the cup is first inserted within the cup leg 38 with the cup in the rotated position 20b. After inserting the stub inlet 40 within the cup leg 38, the axis of the cavity 66 (see FIG. 3) is in alignment with the axis of the main fitting leg 36. The cup is then rotated from its position 20b to position 20a with the cavity 66 then engaging the main fitting leg 36. When the cup is rotated to its position 20a, the engagement of the wire clips 24a and 24b with a cage wire 78 provide a spacing 81 between the cup and the cage wire. This spacing 81 permits rotation of the latch member 68, without interference with the cage wire 78, to a closed position to maintain the engagement of the cavity 66 with the main fitting leg 36.

Figure 6:
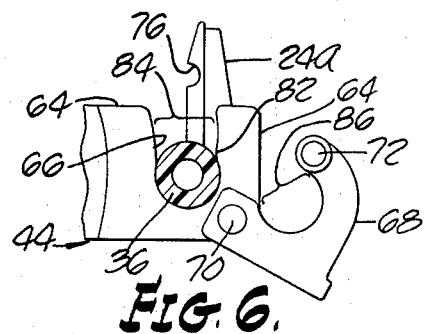
FIG. 6 is an enlarged detail view showing the structure of the snap-fitting member in which a cavity engages a water feeder line and is retained in engagement with the water feeder line by a latch member which is rotatable to a closed position to enclose the cavity.

The functioning of the snap-fitting 44 is illustrated in FIGS. 6 and 6A with FIG. 6 showing the snap-fitting 44 in an opened position and FIG. 6A demonstrating the movement of the latch member 68 between an opened and a closed position. During movement of the cavity 66 into engagement with the exterior surface of the main fitting leg 36, as shown in FIG. 6, a protuberance 82 within the cavity 66 engages the exterior surface of the main fitting leg 36. This results in a spreading apart of the cavity opening 84 as the protuberance 82 slides over the surface of the leg 36. After the protuberance 82 has slid over the main leg 36 to the position shown in FIG. 6, the cavity opening 84 returns to its normal size due to the resiliency of the plastic material forming the support plate 64 while the inner wall of the cavity 66 firmly engages a portion of the circumferential surface of the main fitting leg 36.

The latch member 68 defines a latch opening 86 which is enlarged and spread apart as the latch member 68 is rotated to its closed position to enclose the cavity 66. Turning to FIG. 6A, the rotation of the latch member 68 causes the surface of the end enlargement 72 to contact the surface of the main fitting leg 36. As the surface of end enlargement 72 rides up on the exterior surface of the main fitting leg 36, the latch opening 86 is progressively enlarged until the latch member 68 reaches its dead center position where the centers of the end enlargement 72, the pivot 70, and the main fitting leg 36 fall on a common line termed the dead center line 136. When the center of the end enlargement 72 falls on the dead center line 136, the latch opening 86 is expanded to its maximum opening.

Continued rotation of the latch member 68 in a counterclockwise direction from its position shown in FIG. 6A will cause the end enlargement 72 to ride over the outer surface of the main fitting leg 36 with resultant contraction of the latch opening 86. If the latch member 68 is rotated in a clockwise direction from its position as shown in FIG. 6A, the resiliency of the plastic material forming the latch member will cause contraction of the latch opening 86 which assists in the continued clockwise rotation of the latch member to an open position. As described, the latch member 68 functions as an over-center mechanism with the resiliency of the latch member providing biasing of the latch member to either an open or a closed position, depending upon the rotational position of the latch member with respect to the dead center line 136.

Figure 7:
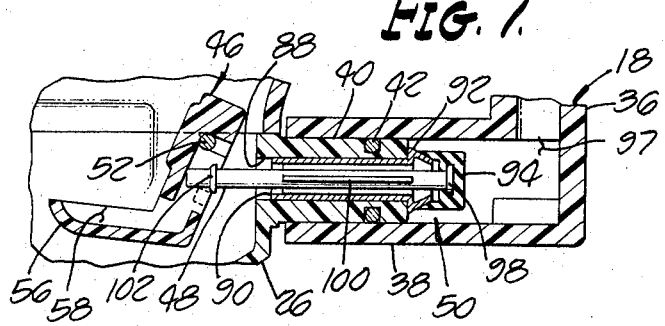
FIG. 7 is a side sectional view through the trigger and valve mechanism in a closed position which is used to control water flow into the drinking cup.
Figure 8:
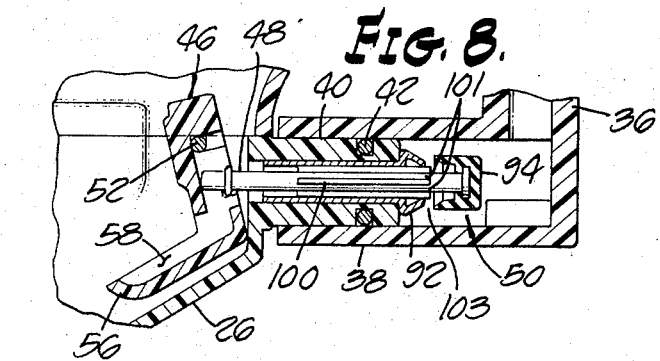
FIG. 8 is a side sectional view of the trigger and valve mechanism of FIG. 7 with valve mechanism in an open position.

The function of the valve mechanism 50 is illustrated in FIGS. 7 and 8 which are each side sectional views of the mechanism. The valve mechanism 50 is shown in closed position in FIG. 7 and in an open position in FIG. 8. The valve mechanism 50 is normally in a closed position due to the water pressure within the interior 97 of the feed line fitting 18. As described previously, the exterior surface of the stub inlet 40 engages the interior surface of the cup leg 38 through a seal member such as an O-ring 42. A valve sleeve 90 engages an inner surface 88 of the stub inlet 40 while the push rod 48 is slidably retained within the valve sleeve 90.

The valve sleeve 90 terminates in a conically shaped valve seat 92 with the push rod 48 terminating in an enlarged head 98 which engages a valve cup 94. A plurality of axial guide ribs 100 are radially positioned about the surface of the push rod 48 for guiding the movement of the push rod within the valve sleeve 90. An annular rib 102 serves to prevent removal of the push rod 48 from the valve sleeve 90 during the transportation, storage, etc., of the drinking cups before they are installed for usage in a poultry house.

With the valve mechanism in a closed position, as shown in FIG. 7, water pressure is exerted against the valve cup 94 to hold it firmly against the valve seat 92. In this position, the push rod 48 is held against the trigger 46 with the lower angle member 56 of the trigger being maintained in a substantially horizontal position.

When the trigger 46 is struck by the birds, the trigger undergoes a counterclockwise rotation from its position shown in FIG. 7 to the new position shown in FIG. 8. This, in turn, causes translation of the push rod 48 to the right from its position shown in FIG. 7 which moves the valve cup 94 away from the valve seat 92. Water is then free to enter opening 103 and to flow along the axis of the push rod 48 through groove-ways 101 defined between the guide ribs 100. The opening of the valve mechanism 50 to the position shown in FIG. 8 is a momentary one since the water pressure returns the valve mechanism to its closed position shown in FIG. 7. Thus, when the opening force is removed from the trigger 46, the valve closes of its own accord.

Figure 9:
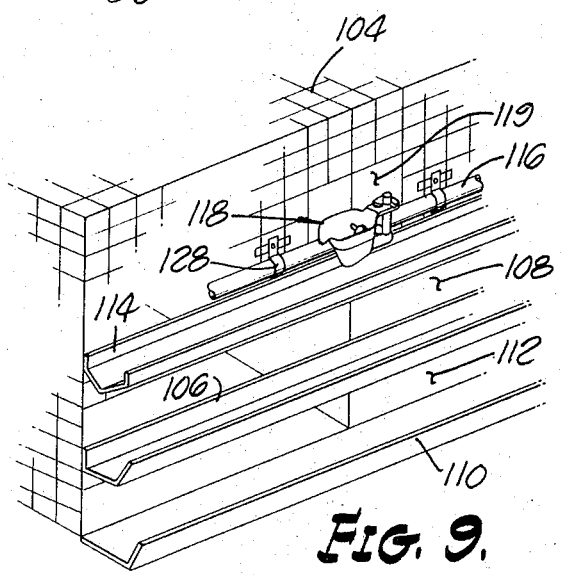
FIG. 9 is a pictorial view of a drinking cup secured on the front of a row of cages with the cup positioned above a drinking trough and having an axial spout to divert any water overflowing the cup into the trough.

As described previously, poultry drinking cups may be installed in the modernizing of an existing poultry house which has used a water trough for watering of the birds. Such an arrangement is illustrated in FIG. 9 in which cages 104 are provided with a feed trough 106, a feed trough opening 108, an egg trough 110, an egg trough opening 112, and a water trough 114. In modernizing such an installation, a water pipe 116 may be secured to the cages by pipe supports 128 with poultry drinking cups 118 being provided at access openings 119.

Figure 10:
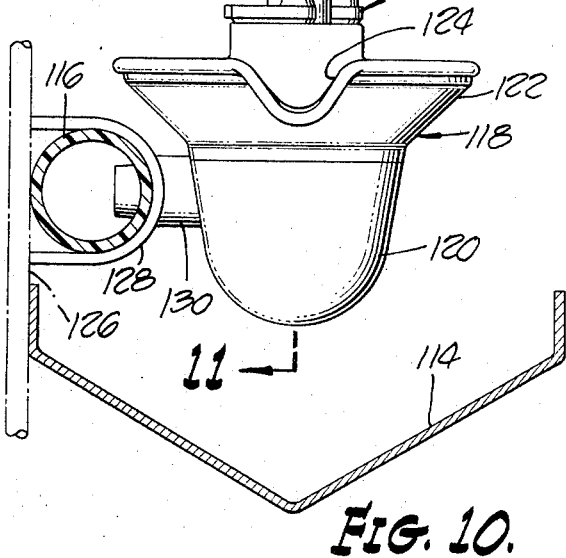
FIG. 10 is an enlarged front view of the drinking cup of FIG. 9 illustrating the placement of the drinking cup with respect to the drinking trough.

The poultry drinking cups 118 may be quite similar to the poultry drinking cups 20, as previously described, in that they may use a snap-fitting and a valve mechanism, etc., However, as shown in FIG. 10 (a front elevational view of the drinking cup 118), the cup includes a cup body 120 and a skirt 122 with an axially positioned spout 124 defined in the skirt. In the arrangement shown, the cup 118 is positioned so that the axially positioned spout 124 diverts any overflowing water into the existing water trough 114 positioned beneath the cup 118. This utilizes the existing trough 114 to carry away any water which overflows the cups 118 to prevent the water from falling into the feed trough 106 or onto the floor of the poultry house.

The water pipe 116 is connected to the cage by pipe supports 128 which encircle the pipe 116 and are connected to cage wires 126. As shown in FIG. 11, the drinking cups 118 may be secured to the pipe 116 through side fittings 129. The side fittings 129 are particularly constructed for attachment of a drinking cup 118 to the side of a water pipe, such as the pipe 116. The side fittings 129 include a mounting saddle 131 which may be used for joining the fitting to the pipe in much the same manner as the mounting saddle 32 as described in regard to FIG. 2. A main fitting leg 130 projects outwardly from the mounting saddle and is joined to a cup leg 132 which may be positioned in the same plane as leg 130 and at approximately a right angle to leg 130. Projecting upwardly from the point of connection of main fitting leg 130 and the cup fitting leg 132 is a support post 134. The support post 134 functions in the same manner as the main leg 36, described in FIGS. 1–8, in providing an attachment support for the snap-fitting 44. With the poultry cup 118 positioned as shown in FIG. 11, the cup is held in an upright fixed position by engagement of the snap-fitting 44 with the support post 134 while water is conveyed to the cup from the pipe 116 through the main fitting leg 130 and the cup fitting leg 132, both of which may be positioned in a substantially horizontal plane.

As described previously, poultry drinking cups may frequently be positioned above a poultry feed trough depending upon the size, shape, and location of the cages, etc. and the space which is available for providing both feed and water for the poultry. Such an arrangement is illustrated in FIG. 12 in which cages 140 have a feed trough 148, feed trough openings 150, an egg trough 144, and egg trough openings 146. A water pipe 138 runs along the front of the cages 140 with pipe supports 142 securing the pipe to the cages. Poultry drinking cups 154 are positioned along the pipe 138 at selected access openings 152 through side fittings 129 as previously described.

FIG. 13, which is a front elevational view of the poultry cup 154 of FIG. 12, illustrates the positioning of the cup 154 with respect to the feed trough 148. The poultry cup 154 may be of the same general structure and function as the poultry cups 20 described in regard to FIGS. 1–8. The poultry cup 154 has a cup body 156 and a skirt 158 which includes a side spout 160 positioned to divert any overflowing water away from the feed trough 148. Any water which overflows one of the poultry cups 154 — for example, if the valve mechanism should be stuck in an open position — is diverted away from the feed trough 148 such that the water is permitted to fall through the open bottom of the poultry cage onto the floor of the poultry house. While it is not intended to purposely cause water to fall onto the floor of the poultry house, this is a more desirable result than having the water fall into the feed trough. As shown, the pipe supports 142 are connected to cage wires 162 of the cages 140 in supporting the pipe 138 with respect to the cages.

The general placement of the drinking cup 154 with respect to the water line 138 is shown in top view in FIG. 14. As shown, the cup 154 is positioned in a generally upright position by the side fitting 129 as previously described. Moreover, the side spout of the cup 154 may divert any overflowing water into the poultry cage where the water may be permitted to fall through the open bottom of the cage to the floor of the poultry house.

Turning to FIG. 15, a water pipe 164 is supported by vertical cage wires 166 and horizontal cage wires 167 through a pipe support 168. In the placement of a water header, in a poultry house, the water header may include a run of 300 feet or more of piping. Due to the length of the piping and the temperature fluctuations encountered in its use and installation, considerable expansion and contraction may occur in the piping. To provide for this expansion and contraction, a slidable coupling (not shown) may be used to connect shorter pieces of piping, such as ten to twelve feet lengths, together to form a run of piping. The slidable joint provides fluid tight sealing engagement between the shorter pieces of piping while, at the same time, permitting movement of the pipes at the joint to control expansion and contraction. The shorter pieces of piping, as illustrated by the pipe 164, are then fixedly secured in some manner so that the drinking cups leading from the piping will be properly spaced at all times with respect to the access openings in the cages.

Many different types of cage configurations are in use and, thus, the placement of piping with respect to the cages will vary from one installation to another. The pipe support 168 is very useful because it can be used for supporting piping for various types of cage constructions. The pipe support 168 includes a wire engagement tab 170 having a plurality of wire openings 172 positioned along either side of the tab. The tab 170 is formed integrally with a pair of yoke arms 174 which terminate at their outer extremeties in pipe clamps 176. A reinforcement rib 178 on the pipe support 168 provides stiffening and strength for the support.

The pipe support 168 may be positioned at any desired angle with respect to the pipe 164 with the pipe clamps 176 partially encircling the pipe. When the pipe support 168 is properly positioned with respect to the pipe 164, the clamps 176 may be permanently secured to the pipe in any suitable manner such as glue or cement placed between the surface of the pipe 164 and the surfaces of the clamps 176. With the pipe support 168 thus positioned with respect to the pipe 164, a vertical cage wire 166 then engages a wire opening 172 in the engagement tab 170.

In use of the pipe supports 168, the supports work in conjunction with each other in providing support for the pipe. Thus, for example, with the wire 166 engaging an opening 172 on the left side of the tab 170, as shown in FIG. 15, the adjacent pipe support 168 would have a wire opening 172 on either the left or right side of the tab 170 in engagement with a vertical cage wire 166. Movement by the pipe in one direction, for example, to the left from its position as shown in FIG. 15, would then be resisted by one clamp 168 positioned as shown in FIG. 15. Movement by the pipe 164 to the right from its position as shown in FIG. 16 would then be resisted by the second pipe support 168 which could, for example, have a wire opening 172 on the right-hand side of the tab 170 in engagement with a vertical cage wire 166. As shown, the horizontal cage wires 167 may bear against the under surface of the tab 170 to provide additional support.

Depending from the underside of the pipe 164 is a feed line fitting 180 of a different type than previously described. The fitting 180 includes a main fitting leg 182 leading to an opening (not shown) in the underside of the pipe 164 with the fitting being connected to the pipe through a saddle 184. A cup fitting leg 186 is joined at approximately a right angle to the main fitting leg 182 with the cup leg providing support for a poultry drinking cup which may be connected thereto. To provide additional strength, axial support ribs 188 extend along either side of the fitting 180 and merge into the saddle 184. The axial support ribs 188 provide greater structural rigidity for the fittings 188 along their major bending axis with the bending stresses being transferred to the saddle 184 and then to the pipe 164.

A pipe plug 190 may be inserted in the end of the pipe 164 and a fitting plug 192 inserted in the opening from the cup fitting leg 186. During shipping and storage of water pipes and fittings for usage in poultry watering, the pipes and fittings are exposed to dirt and debris. Should dirt or debris within the pipes or fittings be conveyed to the valve mechanism of a poultry drinking cup during subsequent usage, it can result in clogging the valve mechanism and in causing the cup to overflow. To avoid this result plugs, such as the plugs 190 and 192, may be placed into the openings in the pipes or fittings to prevent access by dirt or debris during shipping and storage.

Frequently, short runs of pipe, such as ten or twelve feet in length, have fittings, such as the fittings 180, joined to the short run of pipe at the factory. The short pipe run with the fittings attached is then sold and shipped as a unit. With the use of plugs, such as 190 and 192, the shipped unit is then completely protected from dirt and debris.

During the installation of a pipe and fitting unit in a poultry house, the plugs serve another very valuable function. When the units are connected together and placed on stream, there will be a considerable amount of air entrapped within the piping and fittings which may interfere with the operation of the poultry drinking cups. During installation of the drinking cups, the pipe and fittings may advantageously be purged of air as the drinking cups are installed. Thus, assuming that the fitting 180 shown in FIG. 15 is the nearest fitting to the water supply for the water header, the first poultry drinking cup may be installed by removing the plug 192 and waiting until the air has been purged from the legs 182 and 186 before placing a cup on the cup leg 186. Initially, on removal of the plug 192, air will emerge from the opening at the end of the cup fitting leg 186 with a stream of water then emerging from the open end of the cup fitting leg after the air is removed. At this point, the poultry drinking cup can be placed on the cup leg 186, e.g., through use of a snap-fitting as described with regard to FIGS. 1-8.

Then, the entire operation is repeated for the next fitting down the line, followed by the next, and the next, etc. By sequentially placing the drinking cups on the fittings 180 in this manner, the fittings and the pipes are sequentially purged of air until, with the installation of the last drinking cup, the entire unit is purged of air and ready for operation.

The configuration of the reinforcing rib 178 which provides support for both of the yoke arms 174 is shown in FIG. 16 as a bottom view of the yoke in its position shown in FIG. 15. The manner in which the pipe clamps 176 partially encircle the water pipe 164 is shown in side elevational view in FIG. 17. As illustrated, the pipe support 168 is used for supporting a pipe in a generally horizontal position. However, of course, the pipe supports 168 may be used for supporting a pipe in a vertical position in which the wire openings 172 are in contact with horizontal cage wires 167.

The details of a fitting plug, which may be either a large plug such as 190 or a smaller plug such as 192, are shown in FIG. 18. The plug includes a head 194 which may be grasped by the fingers for installation or removal of the plug, a shaft 196 for insertion in the pipe or fitting opening, an annular bead 198, and a plug end 200. Such plugs may be used in the manner described previously or may be used for any sort of emergency which might occur in a poultry house. Thus, for example, if a drinking cup should overflow, the drinking cup could be removed with the opening from the fitting then being temporarily closed by insertion of a plug. The use of the plug would, thus, take care of the immediate emergency until a new drinking cup could be installed.

A further type of cup installation is illustrated in FIG. 19 in which a feed line fitting 204 rises vertically from a water pipe 202. The fittings 204 are somewhat similar to the side fittings 129, as described previously, and include a saddle 206 for connection of the fitting to the pipe 202, a main fitting leg 208 leading from the saddle 206, a cup fitting leg 210 extending in a substantially horizontal direction for engagement with a drinking cup 118, and an upwardly extending support post 212 for engagement by a snap-fitting 44 as described previously. When supported in this manner, the drinking cup is positioned above the axis of the water pipe 202.

Figure 20:
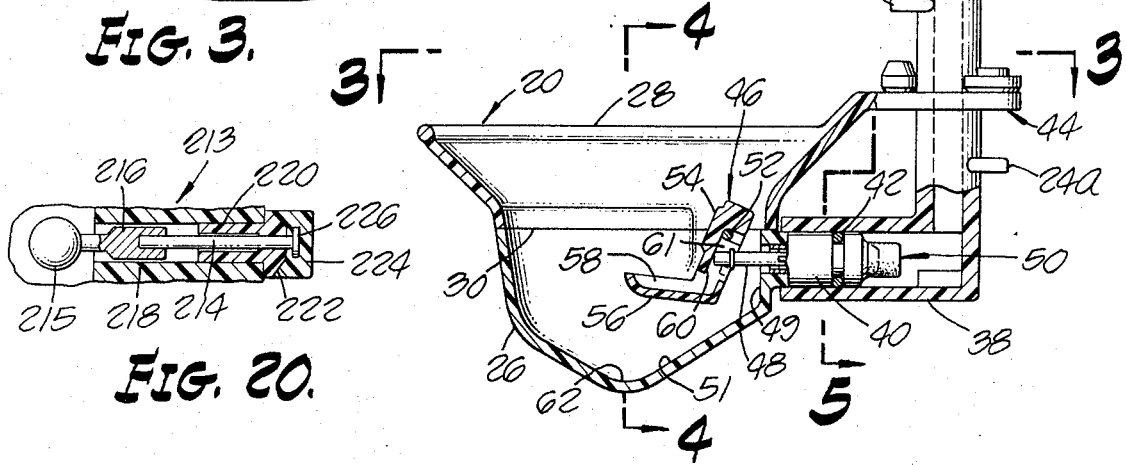
FIG. 20 is a detailed side sectional view showing an alternative form of actuating the valve mechanism of the drinking cup by movement of a fount which extends into the cup body.

In the foregoing description, poultry drinking cups have been described with regard to using a trigger pivotally mounted within the cup body for actuation of the valve mechanism. It should be understood that the valve mechanism may be actuated by other means and an alternative means is illustrated in FIG. 20 which is a partial side sectional view of a valve mechanism 213 taken along generally the same viewing plane as used in FIG. 7. As shown, a stub inlet 218 contains a valve sleeve 220 which terminates in a valve seat 222. A valve stem 214 is slidably positioned within the valve sleeve 220 with its inner end being joined to a fount 215 through a connecting member 216. The outer end of the stem 214 is enlarged at 226 and carries a valve cup 224. The valve mechanism 213 is in a closed position as shown in FIG. 20. However, when the fount 215 is struck by the birds, the valve stem 214 will be forced to the right from its position in FIG. 20 to move the valve to an open position corresponding to that of the valve shown in FIG. 8.

I claim:

1. A poultry drinking cup comprising:
a cup body having an input opening means;
valve means to control the flow of water through said input opening means into the cup body;
a snap-fitting member formed integrally with said cup;
said snap-fitting member including resilient engaging means which define an expandable cavity;
said cavity being shaped and positioned to clamp said water feed line or said support member through resilient expansion of said cavity to at least partially enclose said feed line or said support member with said cavity then undergoing resilient contraction to clamp said water feed line or said support member, whereby the poultry drinking cup may be readily connected to a water feed line by connecting the input opening means with the water feed line and engaging the snap-fitting member with the water feed line or the support member to resiliently enlarge the cavity in the snap-fitting member with the cavity then undergoing resilient contraction to clamp said water feed line or said support member.

2. The poultry drinking cup of claim 1 including a seal member positioned adjacent said input opening means to provide fluid tight engagement between said input opening means and a water feed line.

3. The poultry drinking cup of claim 2 including a stub input line connected to said cup body, and said seal member positioned to provide fluid-tight engagement of the stub input line and the water feeder line when the poultry drinking cup is mounted on the feeder line.

4. The poultry drinking cup of claim 3 wherein said stub input line is positioned axially with respect to the axis of said cup body.

5. The poultry drinking cup of claim 3 wherein said stub input line is positioned transversely with respect to the axis of said cup body.

6. The poultry drinking cup of claim 1 including
a trigger mounted within said cup body, and
said trigger connected to said valve means,
whereby the striking of said trigger by poultry using the cup actuates the valve means to intermittently admit water into the cup.

7. The poultry drinking cup of claim 6 including
a low point within said cup body, and
said low point being positioned in close proximity to said trigger,
whereby water which collects at said low point serves as a lure to poultry to strike the trigger in drinking from said low point.

8. The poultry drinking cup of claim 1 including
a fount connected to said valve means, and
said fount projecting into said cup body,
whereby the striking of the fount by poultry using the cup actuates said valve means to intermittently admit water into the cup.

9. The poultry drinking cup of claim 8 including
a low point within said cup body, and
said low point being positioned in close proximity to said fount,
whereby water which collects at said low point serves as a lure to poultry to strike the fount in drinking from said low point.

10. The poultry drinking cup of claim 1 including
an outwardly flared, upwardly projecting skirt on the cup body to reduce the incidence of water spillage from the cup body during usage.

11. The poultry drinking cup of claim 10 wherein the cup body is formed of plastic reinforced with fiberglass.

12. The poultry drinking cup of claim 10 wherein said skirt includes water diverting means with water which overflows from said cup being directed through said diverting means.

13. The poultry drinking cup of claim 12 wherein said diverting means is a spout positioned axially to the axis of the cup body.

14. The poultry drinking cup of claim 12 wherein said diverting means is a side spout positioned transversely to the axis of the cup body.

15. A poultry drinking cup comprising:
a cup body having an input opening means;
valve means to control the flow of water through said input opening means into the cup body;
a snap-fitting member connected to said cup;
said snap-fitting member including engaging means which is engageable with a water feed line or a support member and retaining means to maintain said engaging means in engagement with a water feed line or a support member;
said retaining means including a latch member rotatably mounted for movement between an open and a closed position, with the latch member in its closed position cooperating with the engaging means for retention of the drinking cup with respect to a water feed line or a support member, and the latch member in its open position causing opening of said engaging means for insertion or removal of the water feed line or support member with respect to said engaging means,
whereby the poultry cup may be readily connected to a water feed line by connecting the input opening means with the water feed line and engaging the snap-fitting member with the water feed line or the support member.

16. The poultry drinking cup of claim 15 wherein said engagement means includes a cavity which is engagable with the water feed line or support member.

17. The poultry drinking cup of claim 16 wherein said retaining means includes a protuberance extending into said cavity from the cavity wall with the size and location of the protuberance providing contact between the cavity wall and the water feed line or support member to resiliently enlarge the cavity opening as the protuberance slides over the water feed line or support member.
whereby the cavity opening enlarges as the protuberance slides over the water feed line or support member and then contracts when the protuberance has slid past the water feed line or support member.

18. The poultry drinking cup of claim 16 wherein said latch member includes an end portion whose size and position provide a pressure contact between said latch member and the water feed line or support member when the latch member is rotated between its open and closed position with the feed line or support member engaged in said cavity;
whereby the pressure contact of the end portion expands said latch member as the end portion slides over the feeder line or support member and the latch member then concontracts after the end portion has slid past the feeder line or support member.

* * * * *